(12) United States Patent
Gould et al.

(10) Patent No.: US 10,511,570 B2
(45) Date of Patent: Dec. 17, 2019

(54) SYSTEMS, DEVICES, AND METHODS FOR LOCALITY-BASED DOMAIN NAME REGISTRY OPERATION VERIFICATION

(71) Applicant: VERISIGN, INC., Reston, VA (US)

(72) Inventors: James Gould, Leesburg, VA (US); Christopher Klein, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 268 days.

(21) Appl. No.: 15/251,339

(22) Filed: Aug. 30, 2016

(65) Prior Publication Data

US 2018/0063078 A1   Mar. 1, 2018

(51) Int. Cl.
| | | |
|---|---|---|
| H04L 29/12 | (2006.01) | |
| G06Q 30/06 | (2012.01) | |
| G06Q 50/10 | (2012.01) | |
| H04L 29/08 | (2006.01) | |

(52) U.S. Cl.
CPC ......... H04L 61/3025 (2013.01); G06Q 30/06 (2013.01); G06Q 50/10 (2013.01); H04L 61/1511 (2013.01); H04L 61/302 (2013.01); H04L 67/30 (2013.01)

(58) Field of Classification Search
CPC ............... H04L 61/1511; H04L 61/302; H04L 61/3025; H04L 67/30; G06Q 30/06; G06Q 50/10
See application file for complete search history.

(56) References Cited

U.S. PATENT DOCUMENTS

| | | | |
|---|---|---|---|
| 7,194,552 B1* | 3/2007 | Schneider | ......... H04L 29/12594 709/217 |
| 7,761,583 B2 | 7/2010 | Shull et al. | |
| 7,953,813 B2 | 5/2011 | Ruiz | |
| 8,904,519 B2 | 12/2014 | Essawi et al. | |
| 9,015,826 B2 | 4/2015 | Park | |
| 2006/0184443 A1 | 8/2006 | Erez et al. | |
| 2007/0130284 A1* | 6/2007 | Stahura | .................. G06Q 30/06 709/217 |
| 2009/0165116 A1* | 6/2009 | Morris | ................ G06F 21/6218 726/14 |
| 2010/0325723 A1 | 12/2010 | Essawi et al. | |
| 2012/0174198 A1 | 7/2012 | Gould et al. | |
| 2013/0254300 A1 | 9/2013 | Berk et al. | |
| 2014/0115341 A1 | 4/2014 | Robertson | |

(Continued)

OTHER PUBLICATIONS

Tipsforyourwebsite "Expired domains—serverhold, serverUpdatedProhibited—what does it mean?," Apr. 5, 2016, https://www.tipsforyourwebsite.com/expired-domains-serverhold-serverupdateprohibited-what-does-it-mean/.*

(Continued)

*Primary Examiner* — Le H Luu
(74) *Attorney, Agent, or Firm* — MH2 Technology Law Group, LLP

(57) ABSTRACT

Embodiments relate to systems, devices, and computing-implemented methods for performing and requesting registry operations using reseller profiles. A domain name registry can store or access associations between domain name reseller identifiers and domain name reseller profiles, and, based on receiving a domain name registry operation request from a domain name registrar that includes a domain name reseller identifier, applying domain name registry operation policies associated with the domain name reseller profile when performing registry operations.

23 Claims, 8 Drawing Sheets

(56) References Cited

U.S. PATENT DOCUMENTS

| | | | |
|---|---|---|---|
| 2014/0230038 A1 | 8/2014 | Leong et al. | |
| 2014/0304412 A1* | 10/2014 | Prakash | H04L 61/1511 709/226 |
| 2015/0033293 A1 | 1/2015 | Nishida et al. | |
| 2015/0350887 A1 | 12/2015 | Huai | |
| 2016/0005051 A1 | 1/2016 | Taylor et al. | |
| 2016/0140159 A1 | 5/2016 | Gupta | |
| 2016/0182490 A1* | 6/2016 | Gupta | G06F 21/6218 713/171 |
| 2016/0182562 A1 | 6/2016 | Gupta et al. | |
| 2016/0248752 A1 | 8/2016 | Blinn | |
| 2017/0093793 A1 | 3/2017 | Waldron et al. | |
| 2017/0195286 A1* | 7/2017 | Stahura | H04L 61/1511 |

OTHER PUBLICATIONS

The Internet Infrastructure Foundation (.SE), "Procedure description Registration Services," Sep. 14, 2012, https://www.iis.se/docs/SE_Routine_descriptions.pdf.*

ARI Registry Services, "Domain Name Lifecycle Policy," Nov. 10, 2014, https://nic.melbourne/wp-content/uploads/2014/07/10-Domain-Name-Lifecycle-Policy.pdf.pdf.*

OpenSRS, "Reseller's Guide to Domain Name Registration and Management," Jan. 7, 2014, https://www.opensrs.com/docs/opensrs_rwi.pdf.*

Zhou, L., Kong, N., Qi, C., Lee, X. Gould, J., "Registry Reseller Extension for the Extensible Provisioning Protocol (EPP);" May 4, 2015, ftp://ftp.apnic.net/public/ietf/ietf-mirror/draft-zhou-eppext-reseller-00.txt.*

Ilait, "Domain Registration Agreement;" Oct. 23, 2011, https://web.archive.org/web/20111023201455/https://www.ilait.com/legal/domain-registration-agreement.*

Extended European Search Report dated Mar. 2, 2017, European Application No. 16191255.5, pp. 1-7.

PTO Non-Final Office Action dated Mar. 19, 2018, U.S. Appl. No. 14/868,972, pp. 1-21.

Notice of Allowance issued in corresponding U.S. Appl. No. 14/868,972 dated Sep. 19, 2019, pp. 1-25.

U.S. Office Action issued in corresponding U.S. Appl. No. 14/868,972 dated Jun. 13, 2019, pp. 1-17.

* cited by examiner

SYSTEMS, DEVICES, AND METHODS FOR LOCALITY-BASED DOMAIN NAME REGISTRY OPERATION VERIFICATION

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, can be delegated to a particular organization, known as a domain name registry ("registry"). The registry is primarily responsible for answering queries for IP addresses associated with domains ("resolving"), typically through DNS servers that maintain such information in large databases, and operating its top-level domain.

In some instances, in order to obtain a domain name, that domain name is registered with a registry through a domain name registrar, an entity accredited by the Internet Corporation for Assigned Names and Numbers (ICANN) and authorized to register Internet domain names on behalf of end-users. However, some end-users may use a domain name registration service provider that is not accredited by ICANN (herein after a "domain name reseller" or "reseller") to register the domain name. Because the domain name reseller is not authorized to register domain names on behalf of end-users, the reseller registers the domain names through an accredited registrar. In some situations, a registrar can be associated with a network of multiple resellers and the resellers can be arranged in one or more layers. For example, a first reseller in a first layer of the reseller network can register a domain name through a second reseller in a second layer of the reseller network, and the second reseller can forward the registration request to the registrar and/or provide an interface for the first reseller to communicate with the registrar.

A registrar may provide an interface for resellers to communicate requests to, for example, renew, create, delete, transfer, update, or otherwise manage domain names. The registrars can use the interface to receive the requests and generate corresponding Extensible Provisioning Protocol ("EPP") requests for transmission to the registry. EPP is generally used by registrars as a vehicle to communicate with the registries in order to register, renew, or manage domain names. The EPP protocol is based on the Extensible Markup Language ("XML"), which is a structured, text-based format. The underlying network transport is not fixed, although the currently specified method is over Transmission Control Protocol ("TCP").

Certain conditions or contexts of a reseller may dictate verification policies or other compliance issues that may need to be addressed when registering, renewing, and/or managing domain names. For example, certain localities may require domain name registries to comply with local compliance and verification policies to operate registry services within the respective locality. This brings a number of challenges to operating a domain registry service for a TLD outside of the locality when a reseller is operating within the locality and/or the selected domain name invokes rules of the locality. For example, in order to comply with a locality's verification process, data that may be needed to perform verification, for example, of a registrant, a domain name, etc., may be only accessible within the locality.

SUMMARY

The present disclosure relates to systems, devices, and methods for performing registry operations using reseller profiles by performing operations that include receiving a request to create an association between a domain name reseller identifier and a domain name reseller profile of multiple domain name reseller profiles that are available, storing the association between the domain name reseller identifier and the domain name reseller profile, receiving a domain name registry operation request that includes the domain name reseller identifier, determining that the domain name reseller identifier is associated with the domain name reseller profile, applying domain name registry operation policies associated with the domain name reseller profile, and performing a registry operation based on applying the domain name registry operation policies.

In some embodiments, the operations can include receiving a request for the domain name reseller profiles that are available, and sending indications of the domain name reseller profiles that are available based on the request.

In further embodiments, the request for the domain name reseller profiles originates from a domain name reseller.

In other embodiments, the request for the domain name reseller profiles originates from a domain name registrar.

In some implementations, the domain name registry operation request can include a request to create a domain name record, delete a domain name record, renew a domain name record, transfer a domain name record, or update a domain name record.

In additional implementations, the domain name registry operation request can include the reseller identifier in wrapper data of the domain name registry operation request.

In further implementations, the domain name registry operation request can include a verification code from a verification service that is in the same locality as a domain name reseller corresponding to the reseller identifier.

In some embodiments, the verification code is digitally signed by the verification service.

In further embodiments, applying the domain name registry operation policies can include analyzing the verification code, and performing the registry operation can include performing a requested registry operation corresponding to the domain name registry operation request based on verifying the verification code, or denying performance of a requested registry operation corresponding to the domain name registry operation request based on being unable to verify the verification code.

In additional embodiments, performing the registry operation can include performing a requested registry operation corresponding to the domain name registry operation request and initiating a time window for receiving a verification code from a domain name reseller, the operations can include putting a domain name corresponding to the domain name registry operation request on server hold based on not receiving the verification code within the time window.

In some implementations, the domain name reseller profile can include a plurality of domain name reseller profiles.

In further implementations, performing the registry operation can include denying performance of a requested registry operation corresponding to the domain name registry operation request based on not receiving a required verification code.

The present disclosure additionally relates to systems, devices, and methods for requesting registry operations using reseller profiles by obtaining instructions to create a domain name reseller with a domain name registry, sending a request for domain name reseller profiles that are available to the domain name registry, receiving indications of the domain name reseller profiles that are available based on the request, determining a domain name reseller profile from the domain name reseller profiles that are available to associate with the domain name reseller, sending a request to create an association between a domain name reseller identifier corresponding to the domain name reseller and the domain name reseller profile, receiving a domain name registry operation request from the domain name reseller, and sending the domain name registry operation request to the domain name registry, the domain name registry operation request comprising the domain name reseller identifier.

In some embodiments, the operations can be performed by a domain name reseller.

In other embodiments, the operations can be performed by a domain name registrar.

In additional embodiments, sending the domain name registry operation request to the domain name registry can include sending the domain name registry operation request to a domain name registrar that forwards the domain name registry operation request to the domain name registry.

In some implementations, sending the domain name registry operation request to the domain name registry can include generating an Extensible Provisioning Protocol (EPP) request based on the domain name registry operation request, and sending the EPP request to the domain name registry.

In further implementations, determining the domain name reseller profile can include determining the domain name reseller profile based on a locality of the domain name reseller.

In additional implementations, the domain name registry operation request can include a request to create a domain name record, delete a domain name record, renew a domain name record, transfer a domain name record, or update a domain name record.

In some embodiments, the operations can include attaching the domain name reseller identifier to the domain name registry operation request as wrapper data.

In further embodiments, the domain name registry operation request can include a verification code from a verification service that is in the same locality as the domain name reseller.

In additional embodiments, the verification code is digitally signed by the verification service.

In some implementations, the domain name reseller profile comprises a plurality of domain name reseller profiles.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
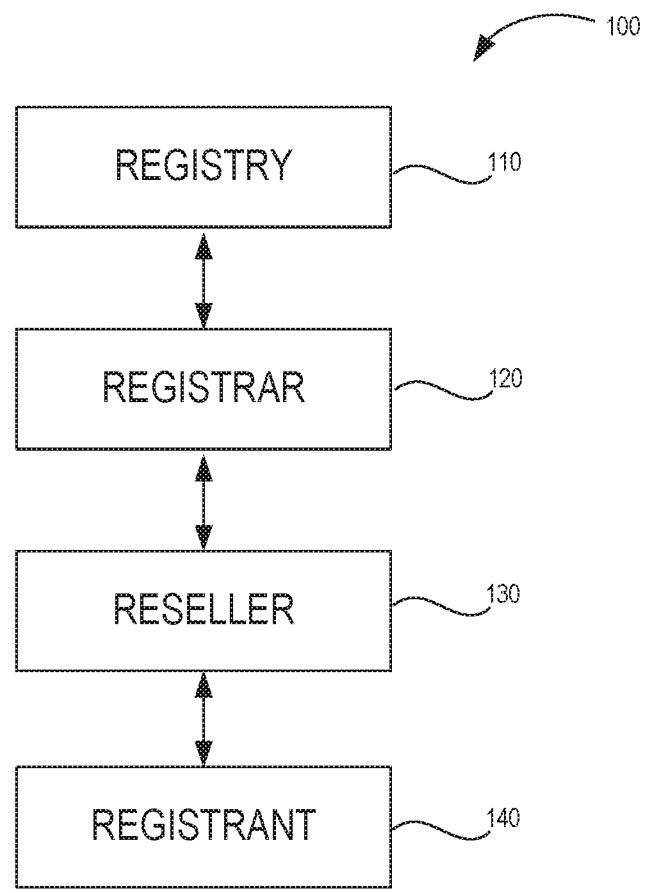
FIG. 1 is a diagram illustrating an example provisioning system, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Current domain registry services may receive requests to create, renew, delete, or otherwise manage domain names from resellers (via registrars) in various different localities. Thus, the resellers may be subject to certain local compliance rules and/or verification policies ("requirements") based on their locality.

As discussed herein, a locality may be a geographic region, or other delineation where a set of requirements is established to perform one or more registry operations. For example, a locality may be a country, a province, a state, a city, a town, or any geographic region that has attributed to it a set of requirements, etc. Alternatively, one or more business entities may be identified as a locality such that the one or more business entities may have associated therewith a profile including a set of requirements. Alternatively, the localities can be hierarchical such that a first locality (e.g., a city) has a set of requirements and a second locality (e.g., a state) in which the first locality is located has its own set of requirements. Thus, in order to perform a registry operation, the requirements for both localities are utilized.

Current domain registry services may not have the technical capacity to identify the requirements that are applicable to a particular reseller that is attempting to, for example, create a domain name record. Thus, current domain registry services may not be able to apply the appropriate policies and/or verify that the reseller has met local requirements that are applicable for the domain name creation, which could have negative implications for the registrant (e.g., the domain name registration could be voided, the registrant could be subject to penalties, the domain name of the registrant could be removed from DNS by the domain name being put on server hold, etc.). As used herein, "server hold" can be a status that removes the domain name from the DNS and, in some embodiments, may only be set and unset by the registry (per EPP standards).

Current domain name registries also may not have the technical capacity to identify the reseller and/or the locality of the reseller. As discussed above, the registry is receiving the request from a registrar (e.g., via EPP) and not directly from the reseller, and the reseller is not accredited or authorized to be directly interacting with the registry. Thus, because the registry is only directly interacting with the registrar, the registry may only be able to identify the reseller if the registrar provides an identification of the reseller to the registry. However, even if the identification is provided, because the reseller is not registered with the registry and may be completely unknown to the registry, the registry may not have a record associated with the reseller and, thus, cannot identify where the reseller is located and/or what verification policies need to be applied.

Moreover, even if the locality of the reseller could be identified by the registry, identifying specific policies associated with the locality can be complicated (e.g., a state may have verification requirements along with additional verification requirements for a city or business within the state) and could require significant processing resources when identifying specific policies for a large number of domain name registry operation requests (e.g., millions of requests). Additionally, the registry or the registrar, which may not be located in the locality of the reseller, may not have access to the data that may be needed to perform a verification for performing a domain name registry operation request (e.g., local rules regarding restricted or prohibited domain names, local citizenship information, etc.). Also, the registrar may be required to satisfy verification requirements that are entirely different from the verification requirements of the reseller, and the registrar may not be able to perform the verification on behalf of the reseller. Thus, even with locality information, current registries and registrars can lack the technical capacity to identify specific policies associated with the locality of a reseller without comprising registry services and current registries and registrars do not have access to the data that may be needed to perform the verification.

Accordingly, in some embodiments, the domain name registry can be configured to store profiles that can be applied when performing a registry operation. Each profile can be associated with one or more requirements associated with a particular locality and actions to perform if requirements are met/not met. For example, a requirement can be that any request for registry operations include or be preceded by a digitally signed verification code from a local verification service that verifies the reseller and/or the registry operation. In various embodiments, the verification code can include, for example, a unique identifier for the verification, indications of the types of verifications performed, a digital signature indicating the identity of the local verification service, etc. As an example, verification codes can be similar to and/or applied similar to the verification codes (e.g., at the registry level) described in U.S. patent application Ser. No. 14/868,972, filed 29 Sep. 2015, which is incorporated by reference in its entirety.

The stored profiles can be available to registrars associated with the registry, and the registrars can maintain records corresponding to resellers that operate with the registrar. For example, a registrar can maintain records for all resellers that are in localities that have special and/or non-default requirements or a registrar can maintain records of all resellers that operate with the registrar. In various embodiments, a profile can include metadata that specifies verification code types, compliance time windows, supported local verification services, etc.

In order to facilitate the application of the correct policies for performing a domain name operation, the registrar can obtain the available profiles from the registry (or some other device) and determine and associate one or more profiles with a reseller (e.g., to a reseller that has special and/or non-default requirements for its locality). For example, the registrar can determine the appropriate profile based on the reseller's locality (e.g., a profile associated with the locality), based on the requirements that the reseller is subject to (e.g., by matching the requirements associated with a profile with the requirements for the reseller), etc. The registrar can then transmit an indication of the selected profile and an identifier ("ID") associated with the reseller to the registry.

When the registry receives the indication of the selected profile(s) and the reseller ID, the registry can store an association between the profile and the ID. In various embodiments, there can be a many-to-many relationship between profiles and reseller IDs. In other words, a single profile can be associated with multiple reseller IDs (e.g., for resellers in the same locality, for resellers in localities with the same requirements, etc.) and a single reseller ID can be associated with multiple profiles (e.g., for a reseller within a hierarchical locality, such as a business entity (first profile), within a city (second profile), within a state (third profile)).

In some embodiments, a reseller profile may override one or more policies of one or more profiles associated with the registrar. If a profile is assigned to the registrar, the registry may allow for the setting of the reseller profile as a mechanism to override the profile of the registrar. Additionally or alternatively, a profile of the registrar may be set so that no profile for the reseller will override that particular profile for the registrar, while other profiles of the registrar can be overridden. However, in an instance where the registrar has no profile associated with it, the setting and the application of reseller profiles can be additive (zero profiles to one or more profiles).

In further embodiments, a reseller may already have one or more profiles associated with it. Thus, the registry can, for example, remove one or more profiles associated with the reseller ID, replace one or more profiles associated with the reseller ID, or add one or more profiles to the one or more profiles that are already associated with the reseller ID. In some instances, when a profile is modified or added, existing domain name associated with the reseller and/or reseller ID may no longer be verified. In some implementations, those domain names could be put into a pending state awaiting submission of verification codes associated with the modified or new profiles.

Subsequently, when the registrar receives a request to perform a registry operation from the reseller, the registrar can determine the reseller ID associated with the reseller, and forward the request to the registry with the reseller ID. Thus, because registry has a stored association between the reseller and one or more profiles, the registry can quickly and efficiently apply the appropriate policies to the registry operation by determining the profile associated with the reseller ID.

Therefore, a domain name system that use such profiles for domain name resellers provides a faster and more efficient way for the registry to determine and apply the appropriate policies for performing registry operations for resellers in different localities. This allows the reseller to meet the verification requirements without having to become a registrar and without having to change their relationship or interface with their registrar.

FIG. 1 is a diagram illustrating an example provisioning system 100, consistent with certain disclosed embodiments. The provisioning system 100 can include a registry 110, a registrar 120, a reseller 130, and a registrant 140.

In some embodiments, the registry 110 can represent one or more computing devices. For example, the registry 110 can represent one or more webservers, databases, mainframe devices, or other computing devices. In additional embodiments, the registry 110 can be a domain name registry that maintains an authoritative list of at least one TLD and publishes DNS TLD zones that are used to resolve domain name queries. The registry 110 can also sell domain names "wholesale" to domain name registrars, such as, for example the registrar 120, or the registry 110 can be can be vertically integrated with registrars, such as, for example, the registrar 120. The registry 110 can provide an interface to receive EPP requests from the registrar 120 for performing registry operations. The registry 110 can communicate with the registrar 120 over a wide area connection, such as, for example, the Internet.

In further embodiments, the registry 110 can store profiles that contain one or more policies for performing registry operations. Additionally, the registry 110 can store associations between reseller IDs and profiles. Further, the registry 110 can process digitally signed verification codes to determine whether the proper verifications for a locality have been performed, determine whether to perform registry operations, deny registry operations (e.g., based on not receiving a required verification code, based on a verification code not passing, etc.), put domain names on server hold (e.g., immediately, after a specified time limit, etc.), determine whether verification codes are properly formatted, determine whether verification codes are corrupted, etc.

In some implementations, the registrar 120 can represent one or more computing devices. For example, the registrar 120 can represent one or more webservers, databases, mainframe devices, or other computing devices. In some embodiments, the registrar 120 can be a domain name registrar that provides retail domain name registration and management services to registrants. The registrar 120 can, in some implementations, be accredited by the registry 110 and/or ICANN or vertically integrated with the registry 110. Accordingly, in such embodiments, management services provided by the registrar 120 are performed in accordance with guidelines designated by the registry 110. The registrar 120 can, in further embodiments, purchase domain names "wholesale" from the registry 110, sell domain names at retail to registrants, such as, for example, the registrant 140, or sell domain names via resellers, such as, for example, the reseller 130.

In additional embodiments, the registrar 120 can communicate with a local verification service, as described, for example, in U.S. patent application Ser. No. 14/868,972, filed 29 Sep. 2015, which is incorporated by reference in its entirety.

In further implementations, the registrar 120 can provide an interface (e.g., a browser-based interface) to receive request from the reseller 130 for performing registry operations. The registrar 120 can communicate with the reseller 130 over a wide area connection, such as, for example, the Internet.

In additional implementations, the registrar 120 can generate a reseller ID for the reseller 130, request profiles from the registry 110, assign a profile to the reseller 130, transmit an indication of the assigned profile and the reseller ID to the registry 110, receive requests to perform registry operations from reseller 130, and forward the requests to registry 110 with the reseller ID.

In some embodiments, the reseller 130 can represent one or more computing devices. For example, the reseller 130 can represent one or more webservers, databases, mainframe devices, or other computing devices. In additional embodiments, the reseller 130 can be a domain name reseller that is not accredited as a registrar through a registry and/or through ICANN, but provides retail domain name registration and management services to registrants through an accredited registrar (e.g., the registrar 120). The reseller 130 can, in some implementations, be accredited by the registrar 120 or vertically integrated with the registrar 120. Accordingly, in such embodiments, management services provided by the reseller 130 are performed in accordance with guidelines designated by the registrar 120.

In additional embodiments, the reseller 130 can communicate with a local verification service (not pictured), described in further detail below. The reseller 130 can communicate with the local verification service to, for example, request a digitally signed verification code, etc. The reseller 130 can receive, from the local verification service, the digitally signed verification code that can be communicated to the registry 110 (e.g., via registrar 120) and/or can be communicated with requests for domain name registry operations that are sent to the registry 110.

In further embodiments, the reseller 130 can also provide other domain name and/or website services, such as website hosting. Further, the reseller 130 can, in various embodiments, provide an interface (e.g., a browser-based interface) to receive instructions from the registrant 140 for performing registry operations. The reseller 130 can communicate with the registrant 140 over a wide area connection, such as, for example, the Internet.

In some implementations, the registrant 140 can represent one or more computing devices. For example, the registrant 140 can represent one or more webservers, databases, mainframe devices, personal computing devices (e.g., laptops, desktops, tablet computers, smartphones, etc.), or other computing devices. In additional embodiments, the registrant 140 can be a computing device of an end user that desires to perform a registry operation. For example, the end user may be attempting to register an available domain name using the reseller 130. The end user can, in some implementations, have an account with the reseller 130 and can communicate with the reseller 130 through a browser-based interface provided by the reseller 130.

In various embodiments, the registrant 140 can perform a registry operation by sending instructions to the reseller 130, the reseller 130 can send a verification request to the local verification service, the reseller 130 can receive a digitally signed verification code from the local verification service, the reseller 130 can send a registry operation request with the digitally signed verification code to the registrar 120, the registrar 120 can identify the reseller ID associated with the reseller 130, the registrar 120 can forward the request to the registry 110 with an indication of the reseller ID and the digitally signed verification code, the registry 110 can identify the profile associated with the reseller ID, and the registry can apply the policies associated with the identified profile, including processing the digitally signed verification code, and perform the requested registry operation, if the policies allow it.

In some embodiments, the setting of the profile(s), the setting of the verification codes, and the sending of the registry operations can be done independently. Additionally, the profile(s) may only be set once, the verification codes may only be set once per domain name, and there can be many registry operations that apply the policies based on the profile set and the verification codes that have been set.

The provisioning system 100 described above is merely a simplified example of a provisioning system. In various embodiments, the provisioning system 100 can include additional registries, registrars, resellers, registrants, etc. Additionally, the provisioning system 100 can include other DNS entities, such as, for example, recursive name servers, internet service providers, local verification service providers, etc.

Figure 2:
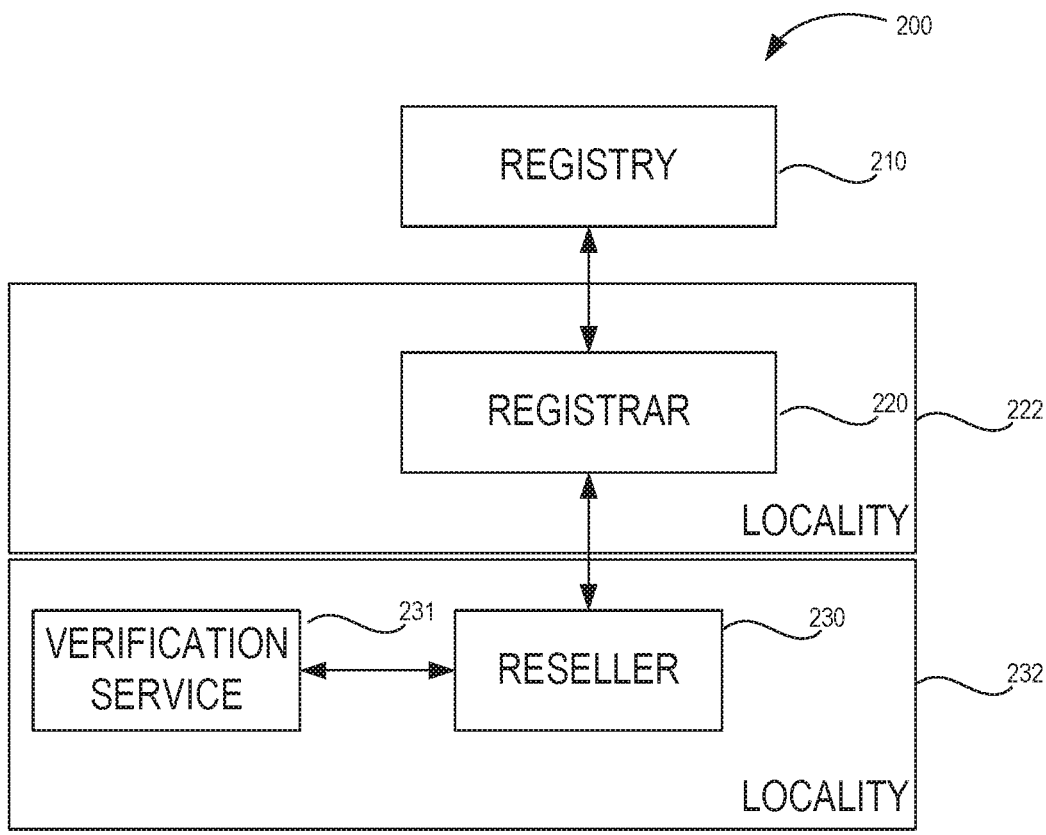
FIG. 2 is a diagram illustrating an example provisioning system, consistent with certain disclosed embodiments.

FIG. 2 is a diagram illustrating an example provisioning system 200, consistent with certain disclosed embodiments. The provisioning system 200 can include a registry 210, a registrar 220 in a locality 222, and a reseller 230 and a verification service 231 in a locality 232.

The provisioning system 200 can be the same or similar to the provisioning system 100 described with regard to FIG. 1. Accordingly, the registry 210, the registrar 220, and the reseller 230 can be the same or similar to the registry 110, the registrar 120, and the reseller 130, respectively.

In some embodiments, the reseller 230 can request that a registry operation is performed by the registry 210. For example, the reseller 230 may have sold a domain name to a registrant (not pictured), and the reseller 230 can request that the domain name be added to the registry. As discussed above, the reseller 230 can interface with the registrar 220 to request the registry operation, and the registrar 220 can forward the request to the registry 210.

The registry 210 may be aware that the registrar 220 is located in the locality 222 because, for example, the registrar 220 is accredited and/or authorized to be directly interacting with the registry and the registry may have previously associated the locality 222 with the registrar 220 and/or may have associated the registrar 220 with a profile that includes policies associated with the locality 222. Additionally, the registrar 220 may have access to a verification service (not pictured) within locality 222. Accordingly, if a registry operation request originates with the registrar 220, the registry 210 can apply the polices associated with locality 222, including, for example, analyzing a digitally signed verification code for the registrar 220.

If the registry operation request originates with the reseller 230, and if the locality 222 is the same as the locality 232, then, if the registry 210 applies the policies associated with the locality 222, the policies would still have been correctly applied. However, if the registry operation request originates with the reseller 230 and if the locality 222 is not the same as the locality 232, then, if the registry 210 were to apply the polices associated with the locality 222, the wrong policies could be applied, which could have negative implications for the registrant (e.g., the domain name registration could be voided, the registrant could be subject to penalties, the domain name may be put on server hold, digitally signed verification codes may not be analyzed properly, etc.).

Accordingly, prior to the registrar 220 requesting the registry operation, the registrar 220 can determine a reseller profile to associate with the reseller 230, generate a reseller ID for the reseller 230, and transmit, to the registry 210, an association between the reseller profile and the reseller ID.

In some embodiments, the locality 232 may have specific local requirements for performing registry operations. Thus, the locality 232 may include the local verification service 231. The local verification service 231 can represent one or more computing devices. For example, the local verification service 231 can represent one or more webservers, databases, mainframe devices, or other computing devices. In additional embodiments, the local verification service 231 can, for example, produce digitally signed verification codes that can be passed to the registry 210. The local verification service 231 can communicate with the reseller 230 over a wide area connection, such as, for example, the Internet. Additionally, the registrar 220 can have an interface for reseller 230 that allows the reseller 230 to pass the verification codes that in-turn the registrar 220 can pass onto the registry 210. In other embodiments, the registrar 220 can interface with the verification service 231 or with a verification service located within the locality 222 (not pictured) on behalf of the reseller 230. In such embodiments, the registrar 220 can extend its interface with the reseller 230 to accept the additional information needed to complete the verification.

The reseller profile associated with the reseller ID for the reseller 230 can include a policy that instructs the registry 210 to check for a digitally signed verification code from a local verification service for any domain name registry operation requests. Additionally, the reseller profile may override one or more policies of one or more profiles associated with the registrar 220. Thus, the registry 210 may allow for the setting of the reseller profile as a mechanism to override the profile of the registrar 220.

Thus, when the registrar 220 receives the registry operation request from the reseller 230, the registry operation request can include a digitally signed verification code, the registrar 220 can identify the reseller ID associated with the reseller 230, and forward the registry operation request to the registry 210 with an indication of the reseller ID and the digitally signed verification code. In some embodiments, once the reseller ID has been initially passed to the registry 210, further registry operation requests may not include the reseller ID because the reseller ID has already been set at the registry 210. In further embodiments, the reseller ID can be set using a communication from the reseller 230 and/or registrar 220 that is separate from a registry operation request. Accordingly, upon receiving a first registry operation request from the reseller 230, the reseller ID may already be set.

Accordingly, the registry 210 can identify that the registry operation request originates with the reseller 230, not the registrar 220, identify the profile associated with the reseller ID, and apply the appropriate policies associated with the locality 232 when performing the registry operation (e.g., analyzing the digitally signed verification code and taking appropriate action if the digitally signed verification code passes or does not pass).

Figure 3:
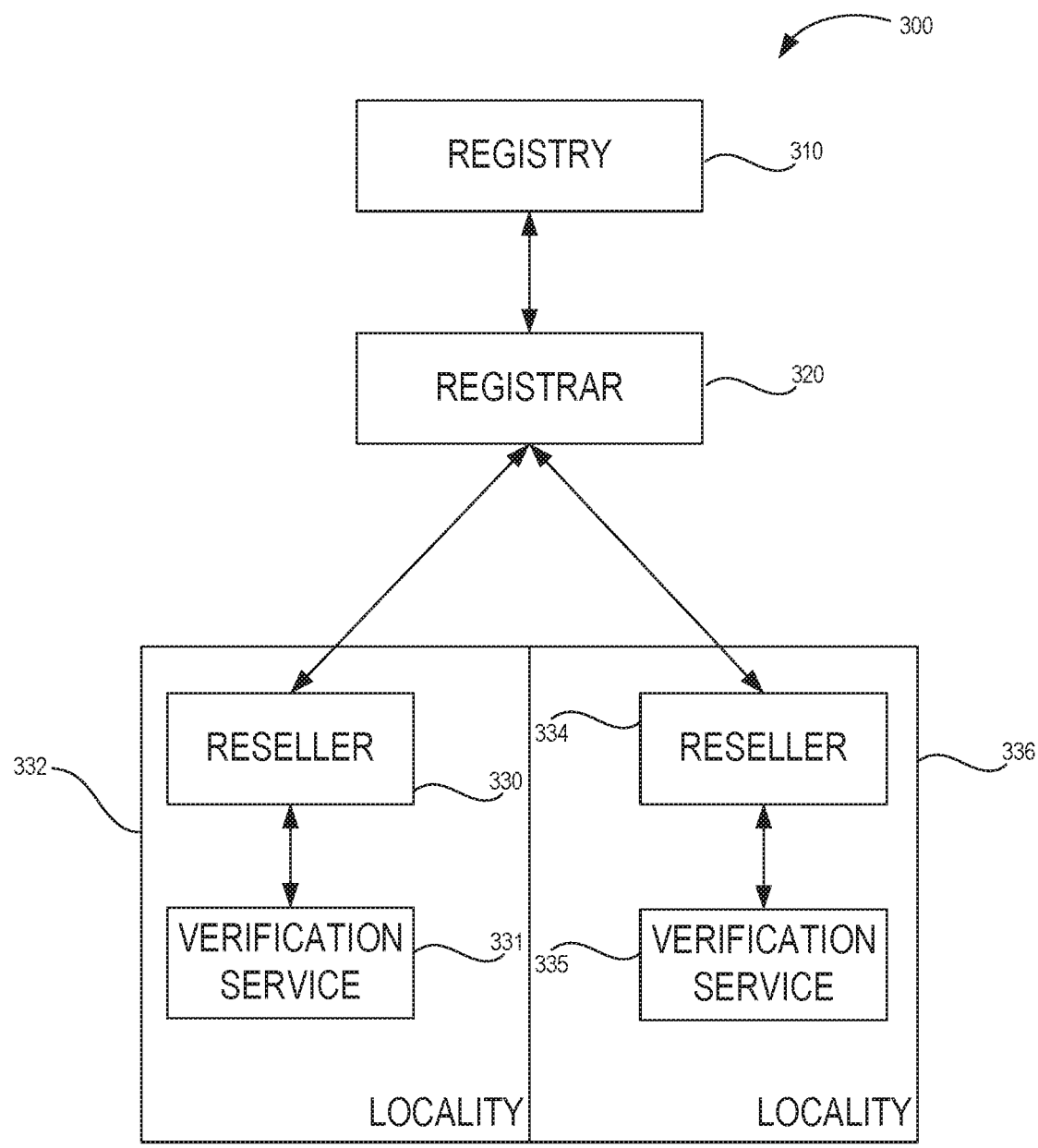
FIG. 3 is a diagram illustrating an example provisioning system, consistent with certain disclosed embodiments.

FIG. 3 is a diagram illustrating an example provisioning system 300, consistent with certain disclosed embodiments. The provisioning system 300 can include a registry 310, a registrar 320, a reseller 330 and a verification service 331 in a locality 332, and a reseller 334 and a verification service 235 in a locality 336.

The provisioning system 300 can be the same or similar to the provisioning system 100 described with regard to FIG. 1 and/or the same or similar to the provisioning system 200 described with regard to FIG. 2. Accordingly, the registry 310, the registrar 320, and the reseller 330 can be, for example, the same or similar to the registry 110, the registrar 120, and the reseller 130, respectively.

In some embodiments, the reseller 330 and the reseller 334 can each request that a registry operation is performed by the registry 310. For example, the reseller 330 and the reseller 334 may have sold domain names to registrants (not pictured), and the reseller 230 and the reseller 334 can request that the domain names be created at the registry 310. As discussed above, the reseller 330 and the reseller 334 can interface with the registrar 320 to request the registry operation, and the registrar 320 can forward the request to the registry 310.

In some embodiments, the locality 332 can be different from the locality 336. Additionally, the requirements for performing registry operations (e.g., creating new domain names records) can be different for the locality 332 and the locality 336.

Accordingly, prior to registrar 320 requesting the registry operation, registrar 320 can determine a reseller profile to associate with the reseller 330 and a reseller profile to associate with the reseller 334, generate reseller IDs for the reseller 330 and the reseller 334, and transmit, to the registry 310, an association between the reseller profiles and the reseller IDs.

The locality 332 may include the local verification service 331, and the locality 336 may include the local verification service 335. The local verification service 331 and the local verification service 335 can each represent one or more computing devices. For example, the local verification service 331 and the local verification service 335 can each represent one or more webservers, databases, mainframe devices, or other computing devices. In additional embodiments, the local verification service 331 and the local verification service 335 can each, for example, produce digitally signed verification codes that can be passed to the registry 310. The local verification services can communicate with the corresponding resellers over a wide area connection, such as, for example, the Internet. Additionally, the registrar 320 can have an interface for reseller 330 and/or reseller 334 that allows the resellers to pass the verification codes that in-turn the registrar 320 can pass onto the registry 310. In other embodiments, the registrar 320 can interface with the verification service 331, the verification server 335, or with a verification service located within its locality (not pictured) on behalf of the resellers. In such embodiments, the registrar 320 can extend its interface with the resellers to accept the additional information needed to complete the verification.

The reseller profiles associated with the reseller IDs for the reseller 330 and the reseller 334 can each include a policy that instructs the registry 310 to check for a digitally signed verification code from a local verification service for any domain name registry operation requests that originate from a reseller associated with either reseller profile. The reseller profiles may also include, for example, metadata that specifies verification code types, compliance time windows, supported local verification services, etc. for analyzing received verification codes. Additionally, the reseller profiles may override one or more policies of one or more profiles associated with the registrar 320. Thus, the registry 310 may allow for the setting of the reseller profile as a mechanism to override the profile of the registrar 320.

Thus, when the registrar 320 receives the registry operation request from the reseller 330, the registry operation request can include a digitally signed verification code, the registrar 320 can identify the reseller ID associated with the reseller 330, and forward the registry operation request to the registry 310 with the digitally signed verification code and an indication of the reseller ID. Accordingly, the registry 310 can identify that the registry operation request originates with the reseller 330, identify the profile associated with the reseller ID, and apply the appropriate policies associated with the locality 332 when performing the registry operation (e.g., analyzing the digitally signed verification code, determining assigned profiles of the reseller, determining types of verification codes expected, determining when the verification should be passed, determining any grace periods for passing the verification does, determining what action to perform if the verification codes are not passed, etc.).

Additionally, when the registrar 320 receives the registry operation request from the reseller 334, the registry operation request can include a digitally signed verification code, the registrar 320 can identify the reseller ID associated with the reseller 334, and forward the registry operation request to the registry 310 with the digitally signed verification code and an indication of the reseller ID. Thus, the registry 310 can identify that the registry operation request originates with the reseller 334, identify the profile associated with the reseller ID, and apply the appropriate policies associated with the locality 336 when performing the registry operation (e.g., analyzing the digitally signed verification code and taking appropriate action if the digitally signed verification code passes or does not pass).

In some embodiments, once a reseller ID for a reseller has been initially passed to the registry 310, further registry operation requests for that reseller may not include the reseller ID because the reseller ID has already been set at the registry 310. In further embodiments, the reseller ID can be set using a communication from the reseller and/or registrar 320 that is separate from a registry operation request. Accordingly, upon receiving a first registry operation request from the reseller, the reseller ID may already be set.

Figure 4:
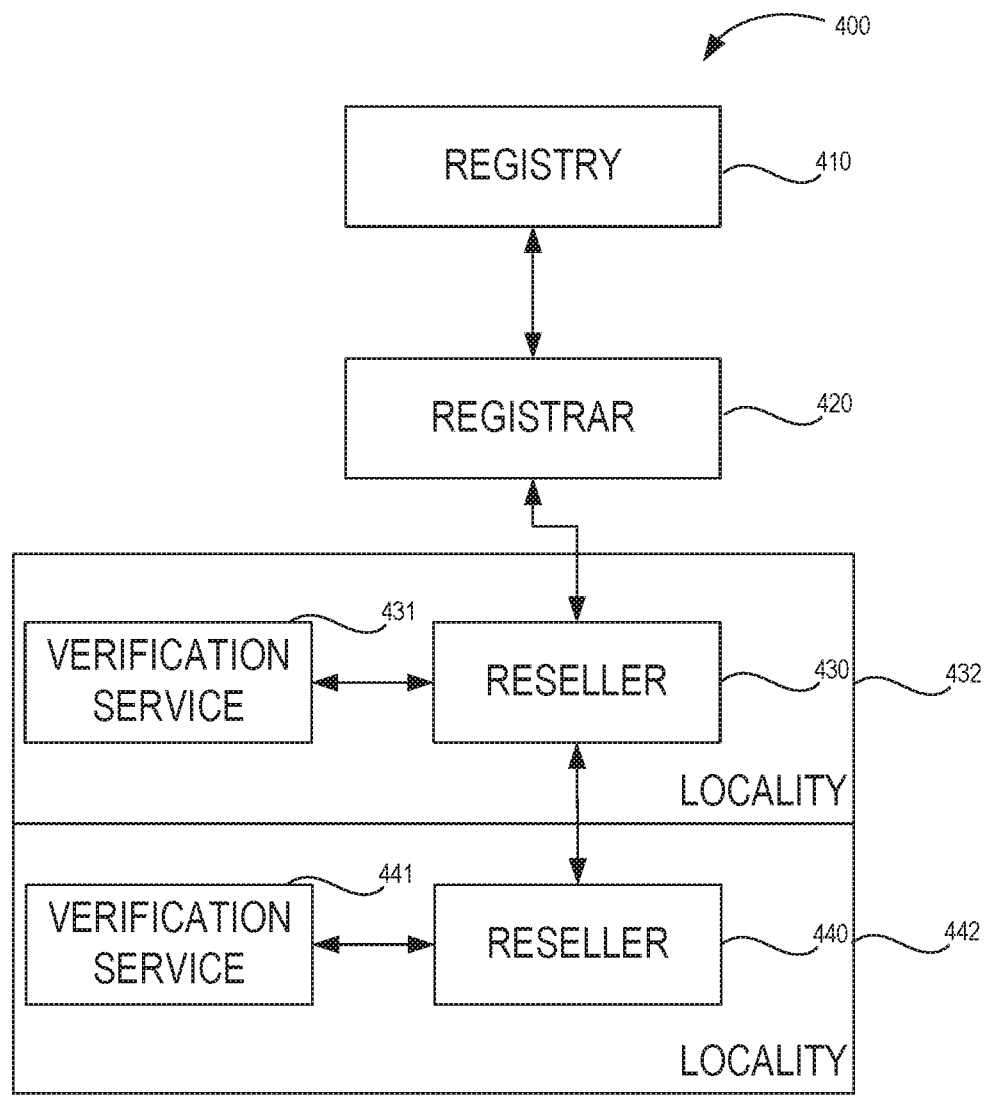
FIG. 4 is a diagram illustrating an example provisioning system, consistent with certain disclosed embodiments.

FIG. 4 is a diagram illustrating an example provisioning system 400, consistent with certain disclosed embodiments. The provisioning system 400 can include a registry 410, a registrar 420, a reseller 430 and a verification service 431 in a locality 432, and a reseller 440 and a verification service 441 in a locality 442.

The provisioning system 400 can be the same or similar to the provisioning system 100 described with regard to FIG. 1, the same or similar to the provisioning system 200 described with regard to FIG. 2, and/or the same or similar to the provisioning system 300 described with regard to FIG. 3. Accordingly, the registry 410, the registrar 420, and the reseller 430 can be, for example, the same or similar to the registry 110, the registrar 120, and the reseller 130, respectively.

In some embodiments, the reseller 440 may not send registry operation requests directly to and/or interface directly with registry 410 or with registrar 420. Instead, reseller 430, which sends registry operation requests directly to and/or interfaces directly with registrar 420, can provide an interface that can be used by reseller 440 to request registry operations. Accordingly, reseller 430 can be a first layer reseller, and reseller 440 can be a second layer reseller.

In some implementations, the reseller 440 can request that a registry operation is performed by the registry 410. For example, the reseller 440 may have sold a domain name to a registrant (not pictured), and the reseller 440 can request that a domain name record is created at the registry 410. The reseller 440 can interface with the reseller 430 to request the registry operation, the reseller 430 can interface with the registrar 420 to forward the registry operation request, and the registrar 420 can forward the request to the registry 410.

As discussed above, the registrar 420 can determine a profile to associate with the reseller 430, generate a reseller ID for the reseller 430, and transmit an association between the reseller ID and the profile to the registry 410. Additionally, the reseller 430 may have access to the verification service 431 within locality 432. Accordingly, if a registry operation originates with the reseller 430, the registry 410 can apply the appropriate policies associated with locality 432, including, for example, analyzing a digitally signed verification code for the reseller 430

If the registry operation originates with the reseller 440, and if the locality 442 is the same as the locality 432, then, if the registry 410 applies the policies associated with the locality 432, the policies would still have been correctly applied. However, if the registry operation originates with the reseller 440 and if the locality 432 is not the same as the locality 442, then, if the registry 410 were to apply the polices associated with the locality 432, the wrong policies could be applied, which could have negative implications for the registrant (e.g., the domain name registration could be voided, the registrant could be subject to penalties, digitally signed verification codes may not be analyzed properly, etc.).

Accordingly, prior to the registrar 420 or the reseller 430 requesting the registry operation, registrar 420 or reseller 430 can determine a reseller profile to associate with the reseller 440, generate a reseller ID for the reseller 440, and transmit to the registry 410 an association between the reseller profile and the reseller ID. For example, registrar 420 could transmit the association directly to registry 410 or reseller 430 could transmit the association to registrar 420 and then registrar 420 could forward the association to the registry 410.

The locality 442 may include the local verification service 441 within the locality 442. The local verification service 441 can represent one or more computing devices. For example, the local verification service 441 can represent one or more webservers, databases, mainframe devices, or other computing devices. In additional embodiments, the local verification service 441 can, for example, produce digitally signed verification codes that can be passed to the registry 410. The local verification service 441 can communicate with the reseller 440 over a wide area connection, such as, for example, the Internet. Additionally, the reseller 430 can have an interface for reseller 440 that allows the reseller 440 to pass the verification codes that in-turn the reseller 430 can pass to registrar 420, and registrar 420 can pass onto the registry 410. In other embodiments, the reseller 430 can interface with the verification service 441 or with the verification service 431 on behalf of the reseller 440. In such embodiments, the reseller 430 can extend its interface with the reseller 440 to accept the additional information needed to complete the verification.

The reseller profile associated with the reseller ID for the reseller 440 can include a policy that instructs the registry 410 to check for a digitally signed verification code from a local verification service for any domain name registry operation requests that originate from a reseller associated with the reseller profile. The reseller profile may also include, for example, metadata that specifies verification code types, compliance time windows, supported local verification services, etc. for analyzing received verification codes. Additionally, the reseller profile may override one or more policies of one or more profiles associated with the registrar 320 and/or the reseller 330. Thus, the registry 310 may allow for the setting of the reseller profile as a mechanism to override the profile of the registrar 320 and/or the reseller 330.

Thus, when the reseller 430 receives the registry operation request from the reseller 440, the registry operation request can include a digitally signed verification code, the reseller 440 can identify the reseller ID associated with the reseller 440 and forward the registry operation request to the registrar 420 with the digitally signed verification code and an indication of the reseller ID. The registrar 420 can forward the registry operation request, the indication of the reseller ID, and the digitally signed verification code to the registry 410. In some embodiments, once the reseller ID has been initially passed to the registry 410, further registry operation requests may not include the reseller ID because the reseller ID has already been set at the registry 410. In further embodiments, the reseller ID can be set using a communication from the reseller 440, the reseller 430, and/or registrar 420 that is separate from a registry operation request. Accordingly, upon receiving a first registry operation request from the reseller 440, the reseller ID may already be set.

Accordingly, the registry 410 can identify that the registry operation request originates with the reseller 440, not the registrar 420 or the reseller 430, identify the profile associated with the reseller ID, and apply the appropriate policies associated with the locality 442 when performing the registry operation (e.g., analyzing the digitally signed verification code).

FIG. 4 depicts two layers of resellers, but, in further embodiments, three or more layers of resellers could be implemented. In such embodiments, the lower layer supports the higher layer in creating a reseller ID, assigning profiles to the reseller, passing the reseller ID to a registrar and/or registry, etc.

Figure 5:
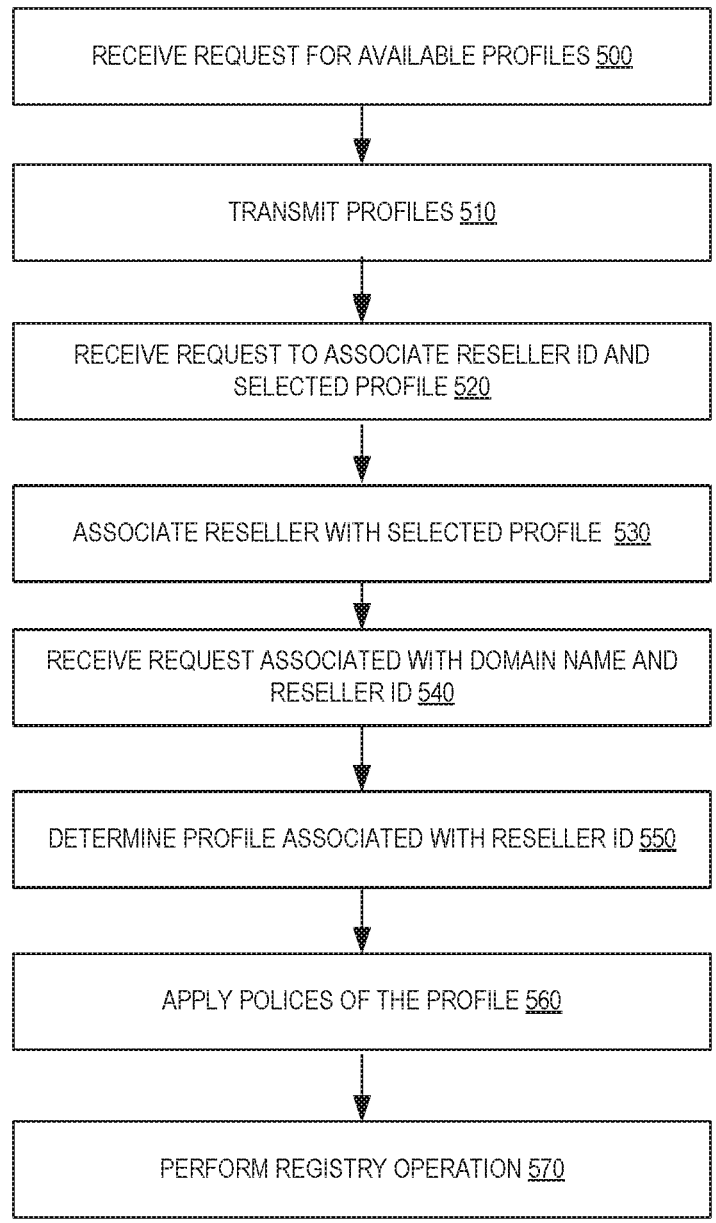
FIG. 5 is a flow diagram illustrating an example process for performing registry operations using reseller profiles, consistent with certain disclosed embodiments.

FIG. 5 is a flow diagram illustrating an example process for performing registry operations using reseller profiles, consistent with certain disclosed embodiments. In some embodiments, the method described in FIG. 5 can be performed using a computing device such as, for example, a database server, a web server, a mainframe computer, a distributed cluster of computing nodes, etc.

In some implementations, the computing device can be, for example, a domain name registry, such as, for example, one of the registries 110-410, described above.

The process can begin in 500, when the computing device receives a request for available reseller profiles from a requesting device. In some embodiments, the requesting device can be a registrar (e.g., one of the registrars 110-410). In additional embodiments, the request can be for all available reseller profiles, the request can be for available reseller profiles that meet certain criteria (e.g., are associated with certain policies, requirements, and/or localities), and/or the request can be for available reseller profiles that are supported by the computing device. As discussed above, the computing device can store one or more profiles or can have access to a database where one or more profiles are stored. Each profile can be associated with one or more polices that can be applied during a domain name registry operation. Policies can be based on requirements for a particular locality.

As an example, a locality may require that a local verification was performed before a domain name is registered. In some embodiments, the local verification can be provided by a verification service provider within the locality. A reseller can transmit a request to the local verification service provider indicating a domain name the reseller has sold or is attempting to sell and information about the registrant. The verification service provider can determine whether to verify the verification request and transmit, to the reseller, a digitally signed verification code that includes, for example, a unique identifier for the verification, indications of the types of verifications performed, a digital signature indicating the identity of the local verification service, etc.

In some embodiments, the reseller can determine whether to proceed with a domain name registry operation based on whether the verification service provider verifies the verification request.

For the above example, the computing device can have access to a profile that is associated with a policy that verifies digitally signed verification codes from that local verification service provider.

In 510, the computing device can transmit information about available profiles to the requesting device. For example, the computing device can transmit information about all available profiles, a subset of available profiles that meet specified criteria, a subset of available profiles that are supported, etc. The information about the available profiles can include, for example, names of the profiles, localities associated the profiles, details about the policies of the profiles, details about the requirements associated with the polices of the profiles, etc.

In 520, the computing device can receive a request to create an association between a reseller ID and a profile. In some embodiments, the request can include, for example, a name of the reseller, a locality associated with the reseller, the reseller ID, the name of the profile, etc.

In 530, the computing device can store an association between the reseller ID and the profile indicated in the request in 520. In some embodiments, the computing device can store the association in local memory, in one or more databases, etc.

In 540, the computing device can receive a domain name registry operation request. The registry operation request can include a domain name associated with the request. In various embodiments, the registry operation request can be to, for example, create a domain name record, delete a domain name record, renew a domain name record, transfer a domain name record, update a domain name record, or otherwise manage a domain name record. In some embodiments, the request can include a reseller ID. For example, the reseller ID can be included in wrapper data that precedes or frames the registry operation request, and the wrapper data may have been added by a registrar or a reseller, as discussed with regard to FIG. 6. As an additional example, the reseller ID can be included within the request.

In further embodiments, the request can additionally include a digitally signed verification code provided by a verification service that is local to the reseller. In other embodiments, the digitally signed verification code can be included in a separate communication. For example, the reseller may be permitted by its locality to register a domain name prior to meeting all the requirements for the locality. Accordingly, a digitally signed verification code can be provided at a later time to verify that the requirements have been met.

In 550, the computing device can determine the profile associated with the reseller ID received in 540. In some embodiments, the profile can be determined based on an association between the reseller ID and the profile stored in 530.

In 560, the computing device can apply the polices of the profile determined in 550.

In some embodiments, the policy can be to analyze a digitally signed verification code received with the request. Accordingly, the computing device can, for example, process a digitally signed verification code to determine whether the proper verifications for a locality have been performed, and determine whether to perform registry operations, deny performance of registry operations, or put domain names on server hold (e.g., immediately, after a specified time limit, etc.).

In some implementations, the policy can be to allow the registry operations even without a digitally signed verification code. However, in some embodiments, the registry operation can initiate a time window in which the reseller must send a digitally signed verification code to verify that requirements for the locality have been met. If the time window ends and the reseller has not proven that they have met all the requirements for the locality, the domain name can be put on server hold.

In other embodiments, the policy can be to confirm whether the domain name meets certain requirements, such as, for example, language requirements, does not include specified words, does not include certain characters, etc.

In 570, the computing device can perform a registry operation. In some embodiments, if the computing device determines that, after applying the policies, the request is not verified or does not meet certain requirements, the registry operation performed by the computing device can be to deny the requested registry operation, to perform the requested registry operation and start a time window during which the reseller must meet the requirements, and/or to send a notification back to the registrar that the verification failed. If, after applying the policies, the request is verified and/or meets the appropriate requirements, the registry operation performed by the computing device can be to perform the requested registry operation (e.g., create, delete, or otherwise modify the domain name record), end the time window, remove the domain name from server hold, etc.

In further embodiments, the computing device can associate the domain name associated with the registry operation with the reseller that originated the domain name registry operation request.

While the steps depicted in FIG. 5 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
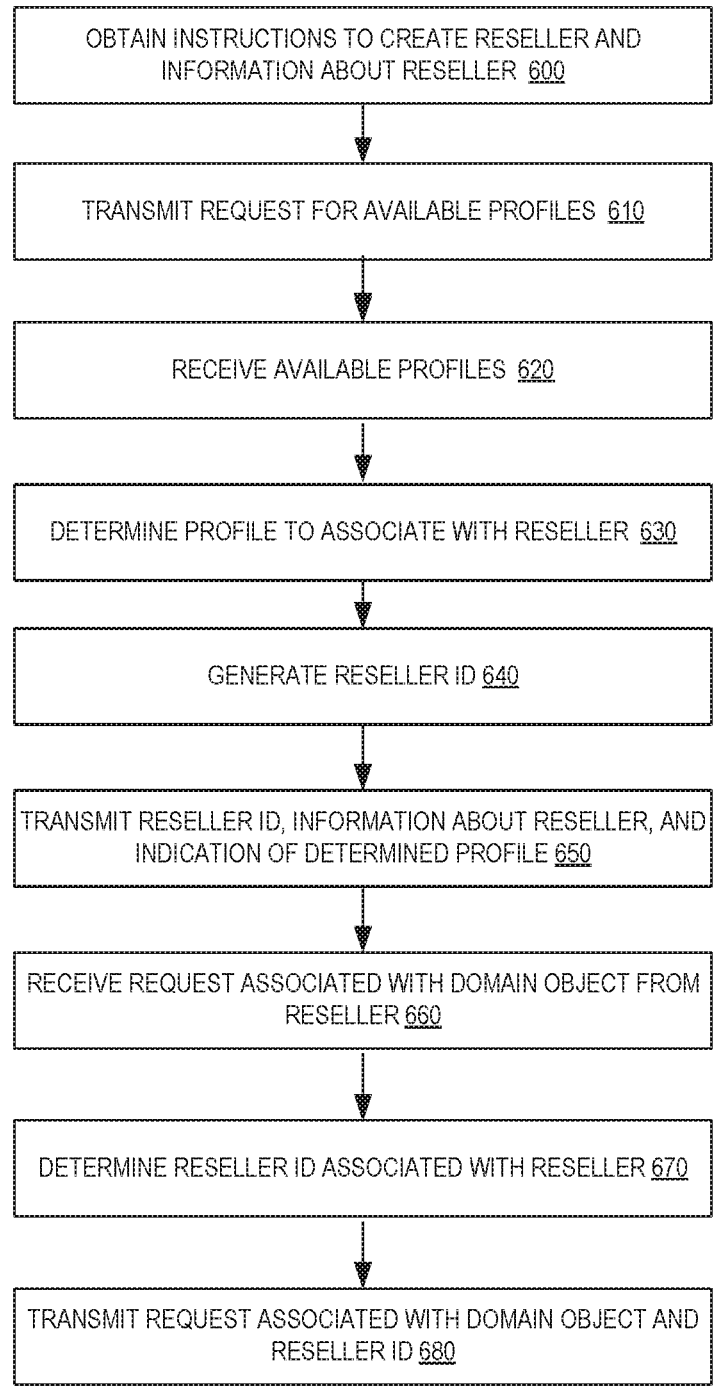
FIG. 6 is a flow diagram illustrating an example process for requesting registry operations using reseller profiles, consistent with certain disclosed embodiments.

FIG. 6 is a flow diagram illustrating an example process for requesting registry operations using reseller profiles, consistent with certain disclosed embodiments. In some embodiments, the method described in FIG. 6 can be performed using a computing device such as, for example, a database server, a web server, a mainframe computer, a distributed cluster of computing nodes, etc.

In some implementations, the computing device can be, for example, a domain name registrar, such as, for example, one of the registrars 120-420, described above. For example, the method can be performed by a registrar based on a request that originated at a reseller that interfaces with the registrar.

In further implementations, the computing device can be, for example, a domain name reseller, such as, for example, the reseller 430, described above. For example, the method can be performed by a first reseller in a first layer based on a request that originated at a second reseller in a second layer that interfaces with the first reseller.

The process can begin in 600, when the computing device obtains instructions to create a new reseller with a registry. For example, the computing device can receive a registration request from a new reseller, receive a request to forward a registry operation request from a new reseller, receive a request from a reseller to forward a registry operation to the registry that has not previously received a request from the reseller, etc.

In some embodiments, the computing device can additional receive information about the reseller, such as, for example, a name of the reseller, a locality of the reseller, requirements associated with the reseller, etc.

In 610, the computing device can transmit a request for available reseller profiles to a registry (e.g., one of registries 110-410) or other devices. In some embodiments, the request can be for all available reseller profiles, for available reseller profiles that meet certain criteria (e.g., are associated with certain policies, requirements, and/or localities), for available reseller profiles that are supported by the registry, etc.

In 620, the computing device can receive information about available profiles from the registry. For example, the computing device can receive information about all available profiles, a subset of available profiles that meet specified criteria, a subset of available profiles that are supported by the registry, etc. The information about the available profiles can include, for example, names of the profiles, localities associated the profiles, details about the policies of the profiles, details about the requirements associated with the polices of the profiles, etc.

In 630, the computing device can determine a profile to associate with the reseller. For example, the computing device can determine the appropriate profile based on the reseller's locality (e.g., a profile associated with the locality), based on the requirements that the reseller is subject to (e.g., by matching the requirements associated with a profile with the requirements for the reseller), etc.

In 640, the computing device can generate a reseller ID to associate with the reseller. For example, the computing device can select a random value as the reseller ID, select the next value in a sequence of reseller ID values, generate the reseller ID programmatically based on information about the reseller (e.g., name, locality, etc.), etc.

In 650, the computing device can transmit a request to create an association between the reseller ID generated in 640 and the profile determined in 630. In some embodiments, the request can include, for example, a name of the reseller, a locality associated with the reseller, the reseller ID, the name of the profile, etc.

In 660, the computing device can receive a request to perform a registry operation from the reseller. In some embodiments, the request can include and be associated with a domain name. In various embodiments, the registry operation request can be to, for example, create a domain name record, delete a domain name record, or otherwise manage a domain name record.

In 670, the computing device can determine the reseller ID associated with the reseller. For example, the computing device can determine the reseller ID associated the reseller based on the reseller's login credentials used to log into the interface provided by the computing device (e.g., a browser-based interface).

In 680, the computing device can forward the domain name registry operation request. The registry operation request can include the domain name associated with the request. In some embodiments, the request can include a reseller ID. In further embodiments, the computing device can generate wrapper data that precedes or frames the registry operation request, and the wrapper data can include the reseller ID. For example, the computing device can append header and/or trailer data to the network packets received from the reseller that included the request. As a further example, the computing device can generate a EPP data transform command for the registry based on the request from the reseller, append the reseller ID and/or a digitally signed verification code to the EPP data transform command as wrapper data, establish a session with the registry, and transmit the EPP data transform command with the wrapper data to the registry.

While the steps depicted in FIG. 6 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 7:
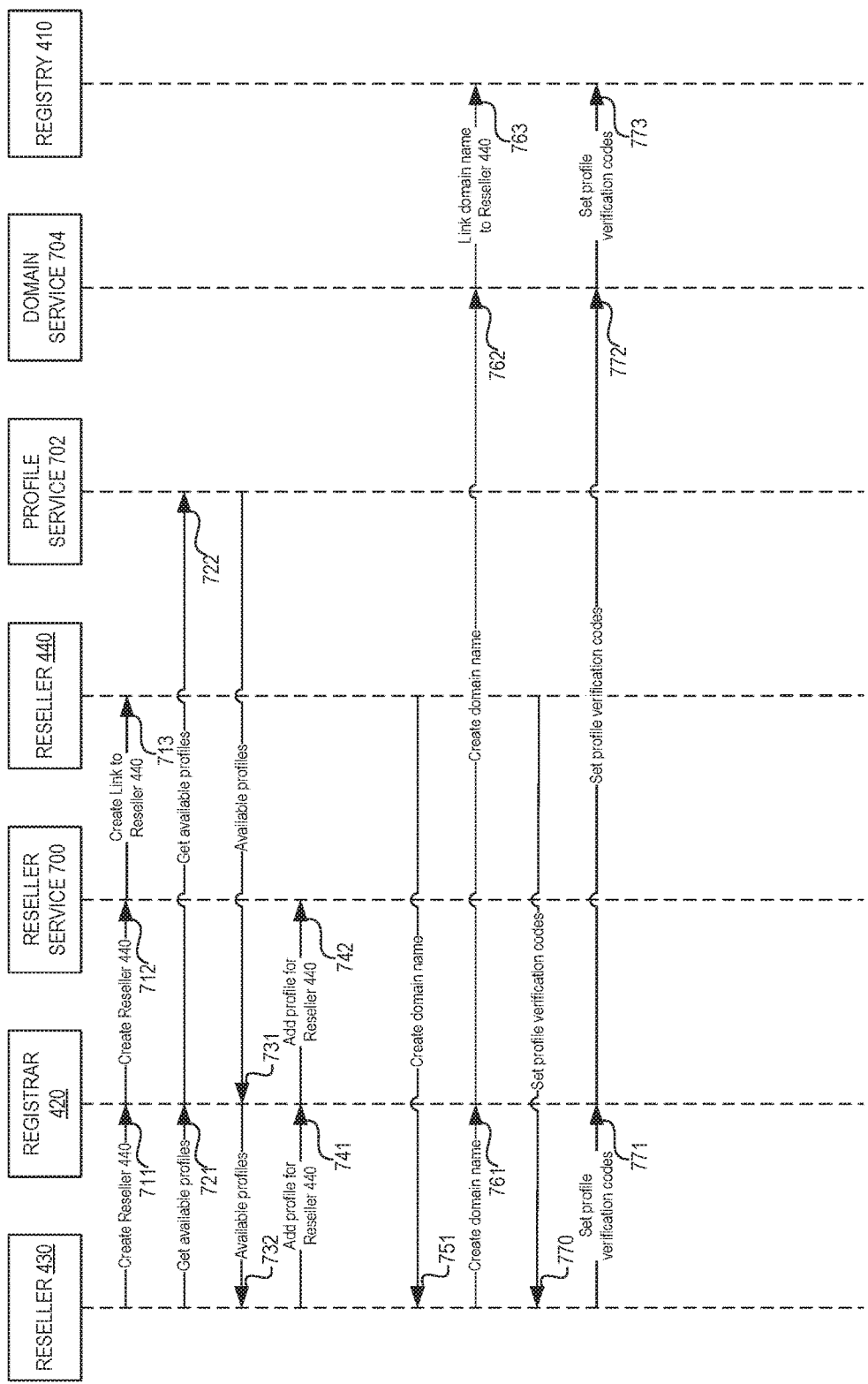
FIG. 7 is a flow diagram illustrating an example process for performing registry operations in an example provisioning system, consistent with certain disclosed embodiments.

FIG. 7 is a flow diagram illustrating an example process for performing registry operations in an example provisioning system, consistent with certain disclosed embodiments. In some embodiments, the process shown in FIG. 7 can be performed using the reseller 430, the registrar 420, the reseller 440, and the registry 410, as described with regard to FIG. 4. Accordingly, as described above, the reseller 430 can provide an interface for reseller 440 to request registry operations through registrar 420 and registry 410. The process can also be performed using a reseller service 700, a profile service 702, and a domain service 704. In some embodiments, one or more of the reseller service 700, the profile service 702, and the domain service 704 can be services provided by the registry 410. Accordingly, the reseller service 700, the profile service 702, and the domain service 704 can be separate devices vertically integrated with the registry 410 or the reseller service 700, the profile service 702, and the domain service 704 can be provided by one or more devices that make up the registry 410.

The process can start in 711 when the reseller 430 transmits a request to create the reseller 440 to the registrar 420 and, in 712, the registrar 420 forwards the request to the reseller service 700. Based on the request, the reseller service 700 can create and store an entry for the reseller 440 (e.g., in a database). Thus, the registry 410 can have a database entry for and be aware of the reseller 440.

In 713, the reseller service 700 can create a link to the reseller 440. Thus, the reseller service 700 and, in some embodiments, the registry 410 would have stored a hierarchy of links of registrar and resellers.

In 721, the reseller 430 can send a request for available reseller profiles to the registrar 420, and, in 722, the registrar 420 can forward the request to the profile service 702. The profile service 702 can determine the available profiles (e.g., applicable and/or supported profiles), and, in 731, can transmit an indication of the available profiles to the registrar 420. In 732, registrar 420 can forward the indication of the available profiles to the reseller 430.

The reseller 430 can determine a profile to associate with the reseller 440 (e.g., based on a locality of the reseller 440) and, in 741, transmit, to the registrar 420, instructions to add the determined profile for the reseller 440 (e.g., with a reseller ID). In 742, the registrar 420 can forward, to the reseller service 700, the instructions to add the determined profile for the reseller 440 (e.g., with the reseller ID). The reseller service 700 can associate the reseller 440 with the determined profile (e.g., using the reseller ID). Thus, the registry 410 can have an association between the profile and the reseller 440.

In 751, the reseller 440 can request the creation of a domain name record (e.g., based on instructions from a registrant) by send a domain name creation request to reseller 430. In 761, the reseller 430 can forward the request to the registrar 420. In some embodiments, the reseller 430 can attach the reseller ID associated with the reseller 440 to the request. In 762, the registrar 420 can forward the request to the domain service 704. Accordingly, the domain service 704 can determine, based on the profile associated with the reseller 440, whether to proceed with the domain name record creation request and/or any other actions to perform based on the profile. For example, the request to create the domain name record may not include a verification code, and the profile may include a policy to allow the creation of the new domain name record without a verification code, to create a time window for receiving the verification code, and to perform a server hold on the domain name if the verification code is not received within the time window. In 763, the registry 410 can link the domain name to the reseller 440 in the registry 410.

The reseller 440 can interface with a verification service within its locality (not shown) to generate the appropriate set of verification codes. In 770, the reseller 440 can set the verification codes for the profile by sending instructions to the reseller 430. In 771, the reseller 430 can forward the verification codes for the profile by sending instructions to the registrar 420, and the registrar 420 can, in 772, forward the instructions to the domain service 772. In 773, the domain service can forward the instructions to the registry 410.

Figure 8:
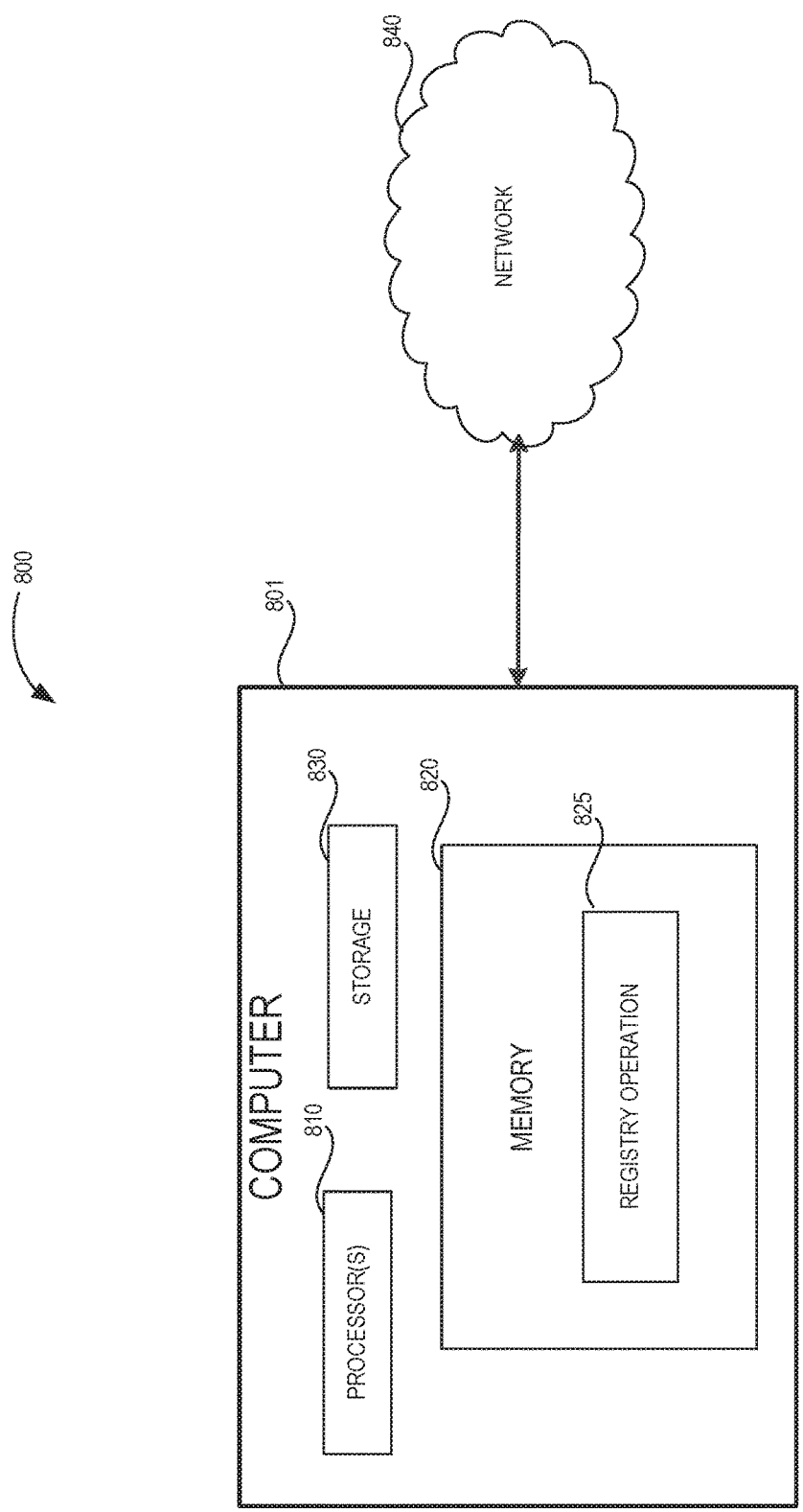
FIG. 8 is a diagram illustrating an example of a hardware system for performing or requesting domain name registry operations, consistent with certain disclosed embodiments.

FIG. 8 is a diagram illustrating an example of a hardware system for performing or requesting domain name registry operations, consistent with certain disclosed embodiments. An example hardware system 800 includes example system components that may be used. The components and arrangement, however, may be varied.

A computer 801 may include a processor 810, a memory 820, a storage 830, and input/output (I/O) devices (not pictured). The computer 801 may be implemented in various ways and can be configured to perform any of the embodiments described above. In some embodiments, the computer 801 can be, for example, a desktop computer, a laptop, a tablet device, a mobile device (e.g., a smartphone), etc. In other embodiments, the computer 801 can be a computing device such as, for example, a database server a web server, a mainframe computer, a distributed cluster of computing nodes and/or graphics processing units (GPUs), etc. In various embodiments, the computer 801 can be a domain name registry (e.g., the registries 110-410), a registrar (e.g., the registrars 120-420), a reseller (e.g., the resellers 130-440), etc. The computer 801 may be standalone or may be part of a subsystem, which may, in turn, be part of a larger system.

The processor 810 may include one or more known processing devices, such as a microprocessor from the Intel Core™ family manufactured by Intel™, the Phenom™ family manufactured by AMD™, or the like. The memory 820 may include one or more storage devices configured to store information and/or instructions used by the processor 810 to perform certain functions and operations related to the disclosed embodiments. The storage 830 may include a volatile or non-volatile, magnetic, semiconductor, tape, optical, removable, non-removable, or other type of computer-readable medium used as a storage device. In some embodiments, the storage 830 can include, for example, domain name records (e.g., one or more zone files), reseller profiles, reseller IDs, associations between reseller IDs and reseller profiles, etc.

In an embodiment, the memory 820 may include one or more programs or subprograms including instructions that may be loaded from the storage 830 or elsewhere that, when executed by the computer 801, perform various procedures, operations, or processes consistent with disclosed embodiments. For example, the memory 820 may include registry operation program 825 for determining performing registry operations, verifying resellers, applying policies, requesting registry operations, forwarding registry operation requests, determining policies associated with localities, etc., according to various disclosed embodiments. The memory 820 may also include other programs that perform other functions, operations, and processes, such as programs that provide communication support, Internet access, etc. The registry operation program 825 may be embodied as a single program, or alternatively, may include multiple sub-programs that, when executed, operate together to perform the function of the registry operation program 825 according to disclosed embodiments. In some embodiments, the registry operation program 825 can perform all or part of the processes of FIGS. 5 and 6, described above.

The computer 801 may communicate over a link with a network 840. For example, the link may be a direct communication link, a local area network (LAN), a wide area network (WAN), or other suitable connection. The network 840 may include the internet, as well as other networks, which may be connected to various systems and devices.

The computer 801 may include one or more input/output (I/O) devices (not pictured) that allow data to be received and/or transmitted by the computer 801. I/O devices may also include one or more digital and/or analog communication I/O devices that allow the computer 801 to communicate with other machines and devices. I/O devices may also include input devices such as a keyboard or a mouse, and may include output devices such as a display or a printer. The computer 801 may receive data from external machines and devices and output data to external machines and devices via I/O devices. The configuration and number of input and/or output devices incorporated in I/O devices may vary as appropriate for various embodiments.

Example uses of the system 800 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system for providing verification and compliance policies for a domain name reseller, the system comprising:
a processing system of a device comprising one or more processors; and
a memory system comprising one or more computer-readable media, wherein the one or more computer-readable media contain instructions that, when executed by the processing system, cause the processing system to perform operations comprising:
receiving a request to create an association between a domain name reseller identifier and a domain name reseller profile of available domain name reseller profiles, wherein the domain name reseller profile comprises data associated with a locality that specifies a verification code type, a compliance time window that specifies a time window to receive a verification code for verifying that a requirement for the locality has been met, a supported local verification service, or a combination thereof;
storing the association between the domain name reseller identifier and the domain name reseller profile;
receiving a domain name registry operation request comprising the domain name reseller identifier;
determining that the domain name reseller identifier is associated with the domain name reseller profile;
applying a domain name registry operation policy associated with the domain name reseller profile; and
performing a registry operation based on applying the domain name registry operation policy.

2. The system of claim 1, further comprising:
receiving a request for the available domain name reseller profiles; and
sending an indication of the available domain name reseller profiles based on the request.

3. The system of claim 2, wherein the request for the available domain name reseller profiles originates from a domain name reseller.

4. The system of claim 2, wherein the request for available domain name reseller profiles originates from a domain name registrar.

5. The system of claim 1, wherein the domain name registry operation request further comprises a request to create a domain name record, delete a domain name record, renew a domain name record, transfer a domain name record, or update a domain name record.

6. The system of claim 1, wherein the domain name registry operation request comprises the domain name reseller identifier in wrapper data of the domain name registry operation request.

7. The system of claim 1, wherein the domain name registry operation request comprises the verification code from a verification service that is in the same locality as the domain name reseller corresponding to the domain name reseller identifier.

8. The system of claim 7, wherein the verification code is digitally signed by the verification service.

9. The system of claim 7, wherein:
applying the domain name registry operation policy comprises analyzing the verification code; and
performing the registry operation comprises:
performing a requested registry operation corresponding to the domain name registry operation request based on verifying the verification code; or
denying performance of a requested registry operation corresponding to the domain name registry operation request based on being unable to verify the verification code.

10. The system of claim 1, wherein performing the registry operation comprises performing a requested registry operation corresponding to the domain name registry operation request and initiating the time window for receiving the verification code from a domain name reseller, the operations further comprising putting a domain name corresponding to the domain name registry operation request on server hold based on not receiving the verification code within the time window.

11. The system of claim 1, wherein the domain name reseller profile comprises a plurality of domain name reseller profiles.

12. The system of claim 1, wherein performing the registry operation comprises denying performance of a requested registry operation corresponding to the domain name registry operation request based on not receiving a required verification code.

13. A system for providing verification and compliance policies for a domain name reseller, the system comprising:
a processing system of a device comprising one or more processors; and
a memory system comprising one or more computer-readable media, wherein the one or more computer-readable media contain instructions that, when executed by the processing system, cause the processing system to perform operations comprising:
obtaining instructions to create a domain name reseller with a domain name registry;
sending a request for domain name reseller profiles that are available to the domain name registry;
receiving indications of the domain name reseller profiles that are available based on the request;
determining a domain name reseller profile from the domain name reseller profiles that are available to associate with the domain name reseller, wherein the domain name reseller profiles comprises data associated with a locality that specifies a verification code type, a compliance time window that specifies a time window for receive a verification code for verifying that requirements for the locality have been met, a supported local verification service, or a combination thereof;
sending a request to create an association between a domain name reseller identifier corresponding to the domain name reseller and the domain name reseller profile;
receiving a domain name registry operation request from the domain name reseller; and
sending the domain name registry operation request to the domain name registry, the domain name registry operation request comprising the domain name reseller identifier.

14. The system of claim 13, wherein the system is a domain name reseller.

15. The system of claim 13, wherein the system is a domain name registrar.

16. The system of claim 13, wherein sending the domain name registry operation request to the domain name registry comprises sending the domain name registry operation request to a domain name registrar that forwards the domain name registry operation request to the domain name registry.

17. The system of claim 13, wherein sending the domain name registry operation request to the domain name registry comprises:

generating an Extensible Provisioning Protocol (EPP) request based on the domain name registry operation request; and sending the EPP request to the domain name registry.

18. The system of claim 13, wherein determining the domain name reseller profile comprises determining the domain name reseller profile based on a locality of the domain name reseller.

19. The system of claim 13, wherein the domain name registry operation request comprises a request to create a domain name record, delete a domain name record, renew a domain name record, transfer a domain name record, or update a domain name record.

20. The system of claim 13, the operations further comprising attaching the domain name reseller identifier to the domain name registry operation request as wrapper data.

21. The system of claim 13, wherein the domain name registry operation request comprises the verification code from a verification service that is in the same locality as the domain name reseller.

22. The system of claim 21, wherein the verification code is digitally signed by the verification service.

23. The system of claim 13, wherein the domain name reseller profile comprises a plurality of domain name reseller profiles.

* * * * *